United States Patent
Truitt

(10) Patent No.: US 7,350,822 B1
(45) Date of Patent: Apr. 1, 2008

(54) LIP COUPLING

(76) Inventor: James M. Truitt, 1009 E. 12th St., Claremore, OK (US) 74017

( * ) Notice: Subject to any disclaimer, the term of this patent is extended or adjusted under 35 U.S.C. 154(b) by 0 days.

(21) Appl. No.: 11/518,629

(22) Filed: Sep. 11, 2006

(51) Int. Cl.
*E03D 11/00* (2006.01)
*F16L 5/00* (2006.01)
*E04C 2/52* (2006.01)

(52) U.S. Cl. .................. 285/56; 285/215; 285/235; 52/220.8

(58) Field of Classification Search ........... 285/235, 285/236, 56, 57, 58, 59, 60, 110, 111, 148.22, 285/148.23, 200, 215, 216, 8; 52/220.8
See application file for complete search history.

(56) References Cited

U.S. PATENT DOCUMENTS

| | | | | | |
|---|---|---|---|---|---|
| 603,222 | A | * | 4/1898 | McLean | 285/110 |
| 809,792 | A | * | 1/1906 | Eustis | 285/8 |
| RE20,706 | E | * | 4/1938 | Aghnides | 285/8 |
| 2,175,648 | A | * | 10/1939 | Roach | 285/110 |
| 2,304,114 | A | * | 12/1942 | Moore | 285/8 |
| 2,797,955 | A | * | 7/1957 | Wilfert | 296/1.06 |
| 2,897,533 | A | * | 8/1959 | Bull et al. | 16/2.1 |
| 3,380,763 | A | * | 4/1968 | Schmunk | 285/110 |
| 4,313,286 | A | | 2/1982 | Herbeke | |
| 4,453,354 | A | | 6/1984 | Herbeke | |
| 4,619,471 | A | | 10/1986 | Herbeke | |
| 5,305,903 | A | * | 4/1994 | Harde | 220/86.2 |
| 6,854,770 | B2 | * | 2/2005 | Leblanc | 285/230 |

* cited by examiner

*Primary Examiner*—James M. Hewitt
(74) *Attorney, Agent, or Firm*—William S. Dorman

(57) ABSTRACT

A lip coupling for connecting together two pieces of pipe above a hole in the floor, the coupling having a semi-spherical upper portion connecting with a lower cylindrical portion, the semi-spherical upper portion having an outer diameter exceeding the outer diameter of the lower cylindrical portion, the lower portion of the semi-spherical portion being provided with a generally transverse lip which is adapted to rest against the floor surrounding the hole, the lip having an underside which is provided with a curved and upwardly directed recess to prevent any unnecessary contact between the lip and any irregularity on the surface surrounding the hole.

2 Claims, 1 Drawing Sheet

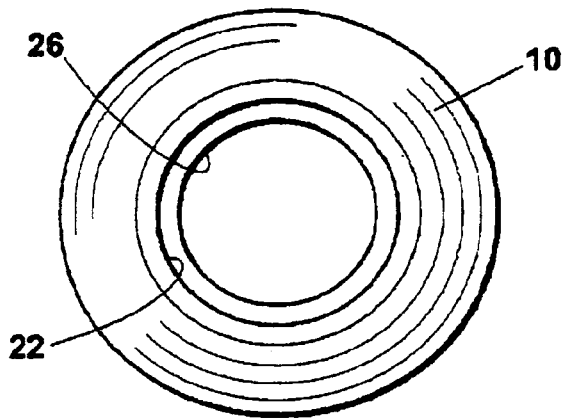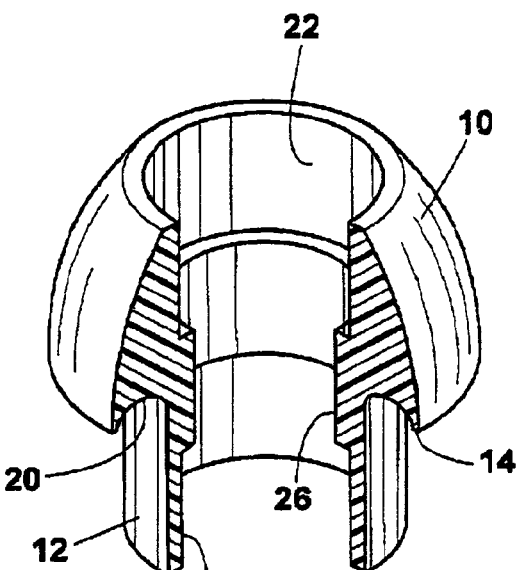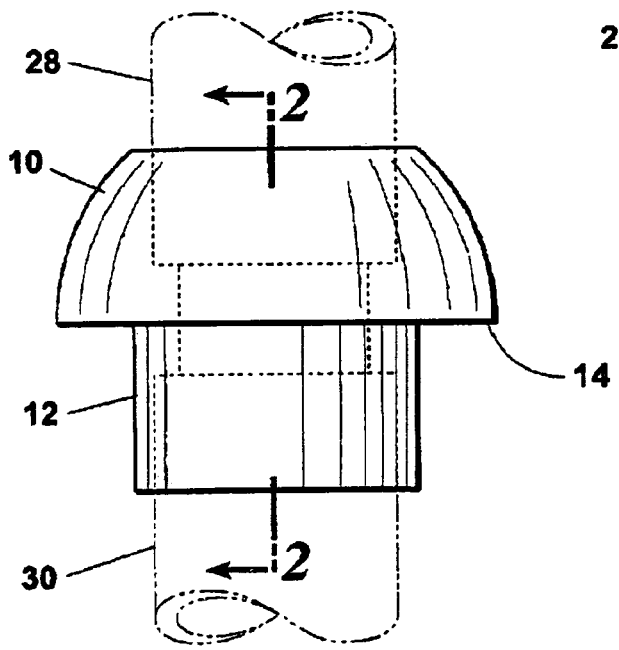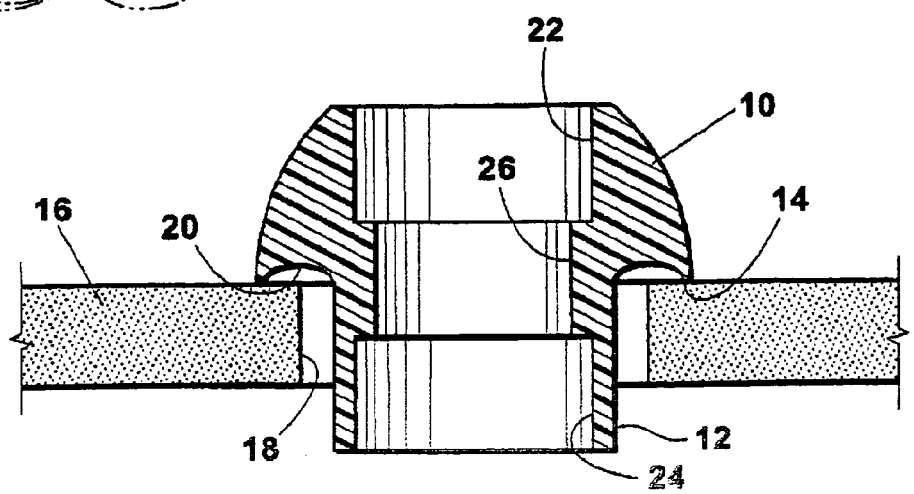

LIP COUPLING

BACKGROUND OF THE INVENTION

1. Field of the Invention

The present invention relates to a device for coupling two pieces of pipe together above or at a hole in the floor. More particularly, the coupling of the present invention is provided with a semi-spherical upper portion of a predetermined diameter and a lower cylindrical portion of reduced outer diameter. The lower end of the semi-spherical portion is provided with a generally transverse lip which is adapted to rest against the floor surrounding the hole.

2. Prior Art

The prior art is replete with examples of couplings for pipes wherein the couplings are embedded in or become part of the floor. However, no prior art coupling exists today where the upper portion thereof is adapted to overlie a hole in the floor to support the coupling on the floor while, at the same time, avoiding an otherwise unsightly appearance.

Harbeke U.S. Pat. No. 4,313,286 (FIG. 7), Harbeke U.S. Pat. No. 4,453,354 (FIG. 7) and Harbeke U.S. Pat. No. 4,619,471 (FIGS. 2 and 5) each show a coupling having an internal flange constituting a ridge stop for separating two pieces of pipe fitted together within the coupling.

SUMMARY OF THE INVENTION

The present invention provides a lip coupling which has a functional aspect in that it is useful for connecting two pieces of pipe together adjacent or above a hole in the floor. The lip coupling of the present invention also has an aesthetically pleasing aspect in that the upper hemispherical portion will cover the hole in the floor and thus obviate what would be an otherwise unsightly appearance. The lip coupling is provided with a generally hemispherical portion of a relatively larger outer diameter connected to a lower cylindrical portion of a relatively smaller diameter. The cylindrical portion will pass through a hole in the floor such that the hole is generally slightly larger than the cylindrical portion. The upper hemispherical portion of the fitting is provided with a generally transverse lip which is adapted to rest against the floor surrounding the hole. The lower lip is also preferably provided with an upwardly directed curved recess such that the outer periphery of the lip actually rests against the floor in the area surrounding the hole so that any irregularities resulting from cutting the hole in the first place would be received within the recess. The outer rim of the lip will actually be in contact with the surface of the floor. Mid-way between the upper end of the coupling and the lower end thereof will be a internal flange having an inner diameter less than the diameter of the pipes to be received in the coupling so that the pipes will come against this flange acting as a stop.

The lip coupling of the present invention can be made from a broad spectrum of pipe materials, with the most common being PVC or cast iron. The coupling may be made with a variety of configurations including male or female solvent weld joints for PVC pipes. The PVC fitting could be created with male threads or tapped threads and in varying sizes with the most common being one and one half and two inch. The fitting could be designed with ears on the edges of the sphere or built into the sphere for rigid anchoring.

And indicated previously, the generally transverse lip of the coupling has an upwardly directed curved recess resulting in a tapered outer edge for the lip so that when the coupling is placed in a hole in the floor it will lay flat on the surface and eliminate any exposed rough edges.

There are several beneficial uses of the lip coupling in both new construction and remodeling. Unsightly holes created by pipe penetration through walls or floors can be completely covered with use of this fitting. Simultaneous continuance runs of pipe and fittings for connection to additional plumbing fixtures is an added benefit.

The conventional riser clamp that is being used today can be replaced with the use of the lip coupling. A self-supporting plumbing system is automatically achieved by placing the lip coupling in a drilled hole in either an existing concrete or wood floor. Also, current building codes require all penetrated holes in a multi-story building be fireproofed. With the lip coupling no fire proofing is required because all holes are completely covered.

A prime example of its use would be: A PVC lip coupling could have a pipe solvent welded into the bottom part of the coupling then placed in the hole or alternatively be secured to the floor, if needed. A solvent weld would be applied into the top part of the coupling for connection of additional pipe extending to the next floor. This can be repeated in a high rise or a two story building.

Labor savings can also be achieved with use of the lip coupling in a multi-story building. With the lip coupling having a section of pipe solvent welded into the bottom part of the coupling, then placed and secured in the hole. one plumber can work underneath while a second plumber on top can work at the same time. This is a beneficial cost savings by allowing two plumbers working off the same lip coupling.

The lip coupling is also beneficial for cleanliness when replacing drain waste piping in a structure that is built over a crawl space. The lip coupling can have the bottom part solvent welded with a piece of pipe, then placed in the hole that has been drilled. The top part of the lip coupling can be piped to hook up a sink in a vanity of from the floor before the workman accesses the crawl space. Whenever that part of the drain is completed the plumber can then access the crawl space to finish uncompleted work. This method keeps the worker clean which undoubtedly will be appreciated by the homeowner. previously, the workman would have to work in the crawl space first then complete the work above the floor.

BRIEF DESCRIPTION OF THE DRAWINGS

FIG. 1 is a side elevation of the lip coupling of the present invention showing, in phantom, two pipes connected internally within the lip coupling.

FIG. 2 is a sectional view, taken along section line 2-2 of FIG. 1, showing the lip coupling in association with a hole through the floor.

FIG. 3 is a plan view of the coupling shown in FIG. 1.

FIG. 4 is a three-quarter isometric view of the pipe coupling as shown in FIG. 1 with the broken portion representing approximately one-quarter of the vertical body of the fitting being removed.

DETAILED DESCRIPTION OF THE PREFERRED EMBODIMENTS

The present invention relates to a device for coupling two pieces of pipe (preferably PVC pipe) together above a hole in the floor. The coupling, which is also preferably made of PVC, has a semi-spherical upper portion 10 connecting with a lower cylindrical portion 12 of reduced outer diameter. The lower end of the semi-spherical portion 10 is provided with a generally transverse or horizontal lip 14 which is adapted to rest against the floor 16 (FIG. 2) surrounding a hole 18. However, the under side of the lip 14 is provided with a curved and upwardly directed recess 20 so as to prevent any unnecessary or undesirable contact with any irregular surface surrounding the hole 18. The hole 18 is shown as having a slightly larger diameter than the outer diameter of the cylindrical portion 12. However, the lip 14 will cover the hole 18 completely so that an unsightly appearance is avoided. Each of the upper and lower members of the coupling is provided with bores 22, 24 respectively, which are preferably the same size. Mid-way of the coupling an internal flange 26 is provided to separate the two bores 22 and 24. The flange 26 will also separate two pipes 28 and 30 which can be received in the bores of the semi-spherical portion and the cylindrical portion, respectively.

Further considering FIGS. 1, 2 and 4, the upper semi-spherical portion 10 is actually a truncated semi-spherical member having a flat top in which the upper bore 22 is located. The spherical surface of the semi-spherical portion 10 curves gradually downwardly and outwardly from the outer edge of the top of the portion 10 to the outer edge of the bottom thereof where it becomes the lip 14. The underside of the lip is provided with an upwardly directed recess 20 which extends from the outer edge of the lip 14 to the outside surface of the lower cylindrical member 12 for the purpose of preventing contact of the upper portion 10 (except for the lip 14 itself) with any irregular surface surrounding the hole 18. The material thickness of the upper semi-spherical portion 10, as represented by the distance from the outer edge of the lip 14 to the bore 22, is greater than that of the lower cylindrical portion 12. The upper and lower portions 10 and 12 are provided with bores 22 and 24, respectively, in which two pipes 28 and 30 can be received. Midway of the coupling, a flange 26 extends inwardly to separate the two pipes. The upper and lower shoulders of the flange 26 constitute stops to prevent the two pipes from contacting each other.

What is claimed is:

1. A lip coupling for connecting together two pieces of pipe above a hole in the floor, the coupling comprising a semi-spherical upper portion having an outer spherical surface and connecting with a lower cylindrical portion having a lower internal bore for receiving a first pipe therein, the semi-spherical upper portion being formed from a truncated semi-spherical member having a flat top in which an upper internal bore is provided for receiving a second pipe therein and the upper portion having a generally transverse bottom provided with a radially outwardly directed lip which is adapted to rest against the floor surrounding the hole, the spherical surface of the semi-spherical portion curving gradually downwardly and outwardly from an outer edge of the flat top of the upper portion to an outer edge of the bottom thereof where it becomes the lip, the lip having an underside which is provided with a curved and upwardly directed recess which extends between an outer edge of the lip and the lower cylindrical portion to prevent any unnecessary contact between the lip and any irregularity on the surface surrounding the hole, the material thickness of the semi-spherical portion, as represented by the distance from the outer edge of the lip to the upper bore, is greater than that of the lower cylindrical portion.

2. A lip coupling as set forth in claim 1 wherein the coupling is provided with an internal flange which projects inwardly between the two bores so as to provide stops for preventing the two pipes from contacting each other.

* * * * *